US012717191B2

(12) United States Patent
Araki et al.

(10) Patent No.: US 12,717,191 B2
(45) Date of Patent: Aug. 25, 2026

(54) PHASE MODULATING DEVICE AND INTELLIGENT REFLECTING SURFACE

(71) Applicant: Japan Display Inc., Tokyo (JP)

(72) Inventors: Shigesumi Araki, Tokyo (JP); Mitsutaka Okita, Tokyo (JP); Daiichi Suzuki, Tokyo (JP); Shinichiro Oka, Tokyo (JP)

(73) Assignee: Japan Display Inc., Tokyo (JP)

( * ) Notice: Subject to any disclaimer, the term of this patent is extended or adjusted under 35 U.S.C. 154(b) by 298 days.

(21) Appl. No.: 18/530,320

(22) Filed: Dec. 6, 2023

(65) Prior Publication Data

US 2024/0103322 A1 Mar. 28, 2024

Related U.S. Application Data

(63) Continuation of application No. PCT/JP2022/021750, filed on May 27, 2022.

(30) Foreign Application Priority Data

Jun. 9, 2021 (JP) ................................ 2021-096553

(51) Int. Cl.
*G02F 1/1343* (2006.01)
*G02F 1/1335* (2006.01)
*H01Q 3/36* (2006.01)

(52) U.S. Cl.
CPC .. *G02F 1/134309* (2013.01); *G02F 1/133553* (2013.01); *H01Q 3/36* (2013.01)

(58) Field of Classification Search
CPC ......... G02F 1/134309; G02F 1/133553; G02F 1/13; H01Q 3/36; H01Q 3/46; H01P 1/184
See application file for complete search history.

(56) References Cited

U.S. PATENT DOCUMENTS

2018/0083364 A1 3/2018 Foo
2018/0287254 A1 10/2018 Nakano et al.
(Continued)

FOREIGN PATENT DOCUMENTS

JP 11-103201 A 4/1999
JP 2019-530387 A 10/2019
(Continued)

OTHER PUBLICATIONS

International Search Report, issued Aug. 9, 2022, in corresponding International Application No. PCT/JP2022/021750, 2 pages.
(Continued)

*Primary Examiner* — Mariam Qureshi
(74) *Attorney, Agent, or Firm* — Maier & Maier, PLLC

(57) ABSTRACT

A phase modulating device includes a first electrode; a second electrode; and a liquid crystal layer including a plurality of liquid crystal molecules and arranged between the first electrode and the second electrode, wherein a height of the liquid crystal layer from the first electrode toward the second electrode is 30 μm or more and 50 μm or less, and in a planar view of a first plane including the first electrode, the liquid crystal layer and the second electrode, the first plane intersecting with an in-plane direction of the first electrode, at least two liquid crystal molecules arranged adjacent to each other in a direction parallel to the in-plane direction of the first electrode and oriented differently from each other are included.

10 Claims, 15 Drawing Sheets

(56) References Cited

U.S. PATENT DOCUMENTS

| | | | | |
|---|---|---|---|---|
| 2019/0064609 | A1* | 2/2019 | Haziza | H01Q 21/065 |
| 2021/0408681 | A1 | 12/2021 | Suzuki et al. | |
| 2022/0140457 | A1* | 5/2022 | Wang | H01P 9/006<br>333/161 |

FOREIGN PATENT DOCUMENTS

| | | | |
|---|---|---|---|
| JP | 2020150496 | A | 9/2020 |
| JP | 2020532911 | A | 11/2020 |
| WO | 2017061526 | A1 | 4/2017 |

OTHER PUBLICATIONS

Iimura, et al. "EO Characteristics of Amorphous and Super-Multidomain TN-LCDs Prepared by a Non-Rubbing Method" The institute of Image Information and Television Engineers Technical Report, vol. 18 (Issue 43), pp. 31-36, 1994, 6 pages.

Doyle, et al. "Development of liquid crystal reflectarrays utilizing a passive matrix control scheme", 2014 IDDD Antennas and Propagation Society International Symposiun, pp. 1031-1032, 3 pages.

English machine translation of Office Action dated Nov. 25, 2025, issued in JP Appl. No. 2023-527616, 5 pages.

* cited by examiner

PHASE MODULATING DEVICE AND INTELLIGENT REFLECTING SURFACE

CROSS REFERENCE TO RELATED APPLICATIONS

This application is a Continuation of International Patent Application No. PCT/JP2022/021750, filed on May 27, 2022, which claims the benefit of priority to Japanese Patent Application No. 2021-096553, filed on Jun. 9, 2021, the entire contents of which are incorporated herein by reference.

FIELD

An embodiment of the present invention relates to a phase modulating device using a liquid crystal material. In particular, an embodiment of the present invention relates to a phase shifter using a liquid crystal material, or a phased array antenna device including the phase shifter. Alternatively, an embodiment of the present invention relates to a metamaterial intelligent reflecting surface in which a liquid crystal material is used.

BACKGROUND

A phased array antenna device has a property that, when a high-frequency signal is applied to part or all of a plurality of antenna elements, the radiation directivity of the antenna can be controlled while the direction of the antenna is fixed in one direction by controlling amplitudes and phases of each high-frequency signal. In the phased array antenna device, a phase shifter is used to control a phase of the high-frequency signal applied to the antenna element.

Various methods have been adopted as a method of the phase shifter, such as a method of physically changing a length of a transmission line in order to change the phase of the high-frequency signal, a method of changing the impedance in the middle of the transmission line in order to change the phase of the high-frequency by reflection, and a method of generating a signal having a desired phase by controlling the gains of an amplifier for amplifying two signals having different phases to synthesize the signal. In addition to these, Japanese laid-open patent publication No. H11-103201 discloses, as an example of a phase shifter, a method using a characteristic specific to a liquid crystal material in which a dielectric constant is changed by an applied voltage.

On the other hand, a metamaterial reflecting surface for applying a phase change to a reflected wave of a radio wave incident on a patch electrode by utilizing the dielectric anisotropy of a liquid crystal is known. By applying different voltages to the patch electrodes adjacent to each other, the metamaterial reflecting surface can make the amount of phase change in each of the patch electrodes different so that they behave as if a reflection direction of the radio wave has apparently changed. For example, Japanese laid-open patent publication No. 2019-530387 discloses a metasurface in which the reflection phase is electronically reconfigured and electronically adjustable.

In a phase modulating device such as a phase shifter or a metamaterial reflecting surface using a liquid crystal, there is a problem that a response speed slows down to several seconds, because a thickness (cell gap) of a liquid crystal layer needs to be 10 times or more as large as that of a liquid crystal display in order to obtain a satisfactory phase change.

There is a need for a phase modulating device capable of achieving a higher response speed.

SUMMARY

A phase modulating device according to an embodiment of the present invention includes a first electrode; a second electrode; and a liquid crystal layer including a plurality of liquid crystal molecules and arranged between the first electrode and the second electrode, wherein a height of the liquid crystal layer from the first electrode toward the second electrode is 30 μm or more and 50 μm or less, and in a planar view of a first plane including the first electrode, the liquid crystal layer and the second electrode, the first plane intersecting with an in-plane direction of the first electrode, at least two liquid crystal molecules arranged adjacent to each other in a direction parallel to the in-plane direction of the first electrode and oriented differently from each other are included.

BRIEF DESCRIPTION OF DRAWINGS

FIG. 5A shows a configuration of a phase modulating device according to an embodiment of the present invention, and shows a planar view in a state where a first substrate and a second substrate overlap.

FIG. 5B shows a planar view of a first substrate of a phase modulating device according to an embodiment of the present invention.

FIG. 5C shows a planar view of a second substrate of a phase modulating device according to an embodiment of the present invention.

DESCRIPTION OF EMBODIMENTS

Figures 1A, 1B, 1C:
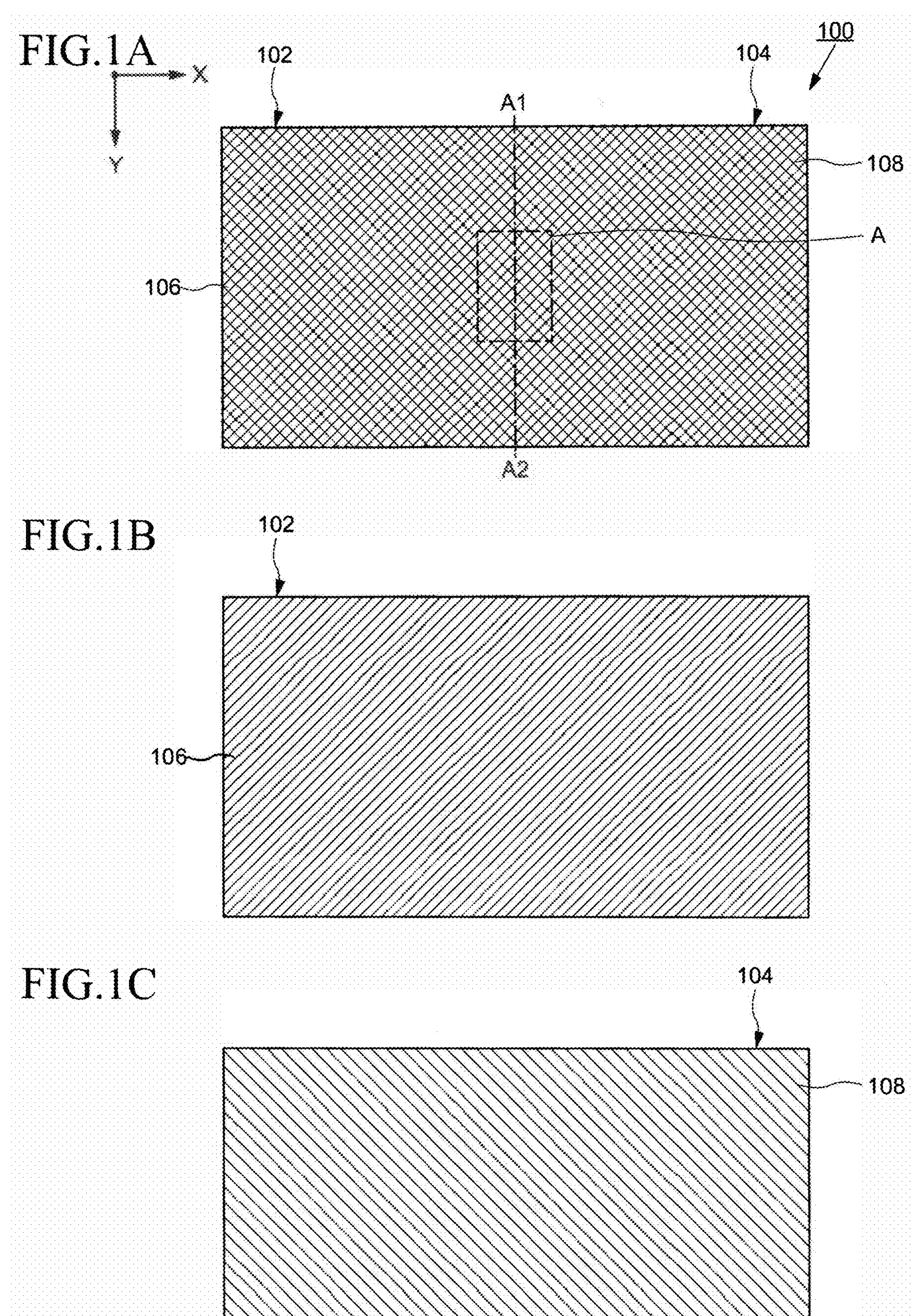
FIG. 1A shows a configuration of a phase modulating device according to an embodiment of the present invention, and shows a planar view in a state where a first substrate and a second substrate overlap.
FIG. 1B shows a planar view of a first substrate of a phase modulating device according to an embodiment of the present invention.
FIG. 1C shows a planar view of a second substrate of a phase modulating device according to an embodiment of the present invention.

Hereinafter, embodiments of the present invention will be described with reference to the drawings and the like. However, the present invention can be implemented in many different aspects, and should not be construed as being limited to the description of the embodiments exemplified below. The width, thickness, shape, and the like of each part may be schematically represented in comparison with the actual embodiments in order to clarify the description, but the drawings are merely examples and do not limit the interpretation of the present invention. In addition, in the present specification and the drawings, elements similar to those described above with respect to the above-described figures are denoted by the same reference signs (or reference signs denoted by a, b, and the like) and detailed description thereof may be omitted as appropriate. Furthermore, the terms “first” and “second” with respect to each element are convenient signs used to distinguish each element, and do not have any further meaning unless otherwise specified.

In the present specification, in the case where a member or region is “above (or below)” another member or region, including, without limitation, the case where it is directly above (or below) the other member or region, also includes the case where it is above (or below) the other member or region, that is, the case where another component is included between above (or below) the other member or region. In the following description, unless otherwise specified, in a cross-sectional view, the upper side is referred to as “on” or “upper” with respect to the front position of the drawing, a surface viewed from “top” or “upper” is referred to as “upper surface” or “upper surface side”, and the opposite side is referred to as “bottom”, “lower”, “lower surface”, or “lower surface side”.

FIG. 1A shows a planar view of a phase modulating device 100 according to an embodiment of the present invention. The phase modulating device 100 has a structure in which a first electrode 106 and a second electrode 108 are arranged so as to face each other. In a planar view where the second electrode 108 is viewed from the first electrode 106 or a planar view where the first electrode 106 is viewed from the second electrode 108, the first electrode 106 and the second electrode 108 have substantially the same flat plate shape, but are not limited to this. For example, in the case where the second electrode 108 is a ground electrode, a width of the first electrode 106 in a Y-axis direction (a second direction to be described later) may be shorter than a width of the second electrode 108.

FIG. 1B shows a planar view of a first substrate 102. The first substrate 102 is a plate-shaped substrate and has an insulating surface. The first electrode 106 is arranged on the insulating surface. In FIG. 1B, a structure in which the first electrode 106 substantially identical to the first substrate 102 is arranged is shown, but the width of the first electrode 106 in the Y-axis direction may be shorter than the first substrate 102.

The first electrode 106 may be manufactured by forming at least one layer of a conductive film on a surface of the first substrate 102. Alternatively, the formed conductive film may be patterned by etching to form the first electrode 106 so that the width of the first electrode 106 in the Y-axis direction is shorter than the first substrate 102 or the second electrode 108. The first substrate 102 is formed of an insulating material such as glass or a ceramic, and an insulating surface may be formed by its physical properties, or an insulating film may be formed by forming an insulating film on its surface. The conductive film is a metal film such as aluminum or copper, and can be manufactured by vacuum-deposition or sputtering. In addition, a metal foil may be used as the first electrode 106 instead of the conductive film.

FIG. 1C shows a planar view of a second substrate 104. The second substrate 104 is a plate-shaped substrate and has an insulating surface. The second electrode 108 is arranged on substantially the entire surface of one main surface of the second substrate 104. The second electrode 108 is also formed of a conductive film.

Figures 2A, 2B:
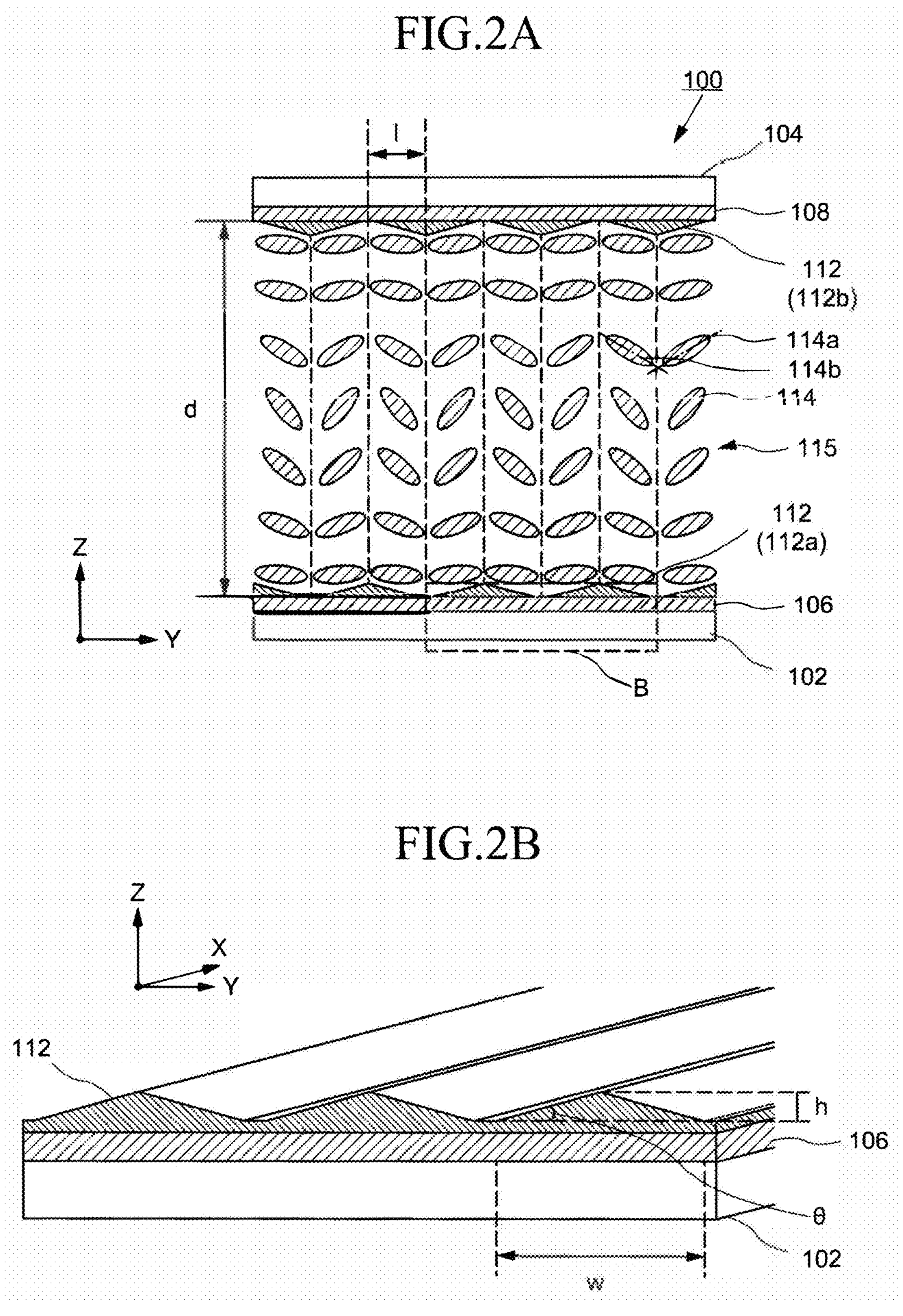
FIG. 2A shows a structure corresponding to FIG. 1A of a phase modulating device according to an embodiment of the present invention, and shows a cross-sectional end view corresponding to a line A1-A2.
FIG. 2B shows an enlarged view of a part surrounded by a broken line part B of FIG. 2A.

FIG. 2A shows a cross-sectional structure of a part A surrounded by a dashed line for a cross-sectional structure along a line A1-A2 shown in FIG. 1A. A liquid crystal layer 115 is arranged between the first electrode 106 and the second electrode 108. The liquid crystal layer 115 is filled with liquid crystal, in other words, the liquid crystal layer 115 includes a plurality of liquid crystal molecules 114. A height d of the liquid crystal layer 115 in a Z-axis direction from the first electrode 106 toward the second electrode 108 is 30 μm or more and 50 μm or less. As shown in FIG. 2A, in a planar view of a cross-section including the first electrode 106, the liquid crystal layer 115, and the second electrode 108 (hereinafter, also referred to as a first plane) intersecting an in-plane direction of the first electrode 106, orientations of two liquid crystal molecules 114 arranged adjacently in a direction parallel to the in-plane direction of the first electrode 106 are different from each other. The phase modulating device 100 is specified by controlling the orientation of the liquid crystal molecule 114 such that the orientations of at least two adjacent liquid crystal molecules 114 are different from each other.

In an embodiment, a liquid crystal molecule 114*a* is inclined with respect to the first electrode 106 (first inclined angle), and a liquid crystal molecule 114*b* arranged adjacently in the direction parallel to the in-plane direction of the first electrode 106 is inclined with respect to the first electrode 106 at a second inclined angle different from the first inclined angle.

Orientation control of the liquid crystal molecule 114 can be realized by arranging a convex structure 112 in the phase modulating device 100 in an embodiment. A plurality of first convex structures 112*a* projecting to the second electrode 108 is arranged in the first electrode 106. In addition, a plurality of second convex structures 112*b* projecting to the first electrode 106 is arranged in the second electrode 108. Orientation of the liquid crystal molecule 114 can be controlled by arranging the plurality of first convex structures 112*a* in the first electrode 106. Therefore, orientation control of the liquid crystal molecule 114 can be performed even in a configuration in which the second convex structure 112*b* is not arranged.

FIG. 2B is an enlarged view showing the convex structure 112 surrounded by a broken line part B shown in FIG. 2A. In addition, the convex structure 112 shown in FIG. 2B is applied to the first convex structure 112*a* and the second convex structure 112*b*. The convex structure 112 has a triangular cross-section in a cross-sectional view at the first plane. The convex structure 112 has a plurality of triangular prism structures extending in the first direction (X-axis direction) parallel to the in-plane direction of the first electrode 106 and arranged in the second direction (Y-axis direction) perpendicular to the first direction. In an embodiment, the triangular cross-section is an isosceles triangle having an inclined angle θ of 3° to 5° with respect to the triangular basal plane. The triangular cross-section has a height h of 1/20 to 1/10 with respect to the height d of the liquid crystal layer 115 (h=d/20 to d/10).

In addition, as shown in FIG. 2A, the first convex structure 112*a* and the second convex structure 112*b* are arranged to face each other. However, a corner (first corner) of the first convex structure 112*a* projecting to the second electrode 108 is arranged apart from a corner (second corner) of the second convex structure 112*b* projecting to the first electrode 106 by a predetermined distance I with respect to the second direction (Y-axis direction). In other words, a perpendicular line from the first corner toward the second electrode 108 is parallel to a perpendicular line from the second corner toward the first electrode 106 and does not coincide with the perpendicular line from the second corner toward the first electrode 106. Due to the arrangement of the first convex structure 112*a* and the second convex structure 112*b*, a partition where the plurality of liquid crystal molecules 114 from the first electrode 106 toward the second electrode 108 is arranged is defined by a width I. In the present embodiment, the width I of the partition is smaller than the height d of the liquid crystal layer 115 (I<d).

As an example, when the height d of the liquid crystal layer 115 is set to 30 μm to 50 μm, the convex structure 112 may be a structure having a triangular cross-section with a base of 34 to 57 μm, an inclined angle of 3 to 5°, and a height of 3 μm. Alternatively, the convex structure 112 may be a structure having a triangular cross-section with a base of 5.7 μm, an inclined angle of 3 to 5°, and a height of 0.3 μm to 0.5 μm.

For example, orientation control of the liquid crystal molecule 114 is a known technique in a liquid crystal display device, but the liquid crystal display device is not designed with the height of the liquid crystal layer 115 of 30 μm to 50 μm like the phase modulating device 100. The thickness of the liquid crystal layer 115 is a structure specific to the phase modulating device 100. In addition, in a liquid crystal display device requiring visibility, the liquid crystal molecule 114 is not arranged in a partition with the width I smaller than the height d of the liquid crystal layer 115. Such orientation control of the liquid crystal molecule 114 using a small partition is a technique that is not conventionally used. In the phase modulating device 100, since the liquid crystal molecule 114 is orientation-controlled by such a small partition, it is possible to realize a high-speed phase modulation control which is not conventional. In the present embodiment, the amount of change in a dielectric constant can be maximized.

This type of convex structure 112 can be realized by stacking a photosensitive organic film and an alignment film. A resin, known as the photosensitive organic film used in an organic planarization film included in an array substrate of the liquid crystal display device, such as an acryl-based resin or a polyimide resin, can be used as a material of the photosensitive organic film. After a resin such as polyimide is applied on surfaces of the first electrode 106 and the second electrode 108 and developed and exposed to form a convex structure, the convex structure 112 in which liquid crystals are oriented can be formed using a rubbing method.

Figures 3A, 3B:
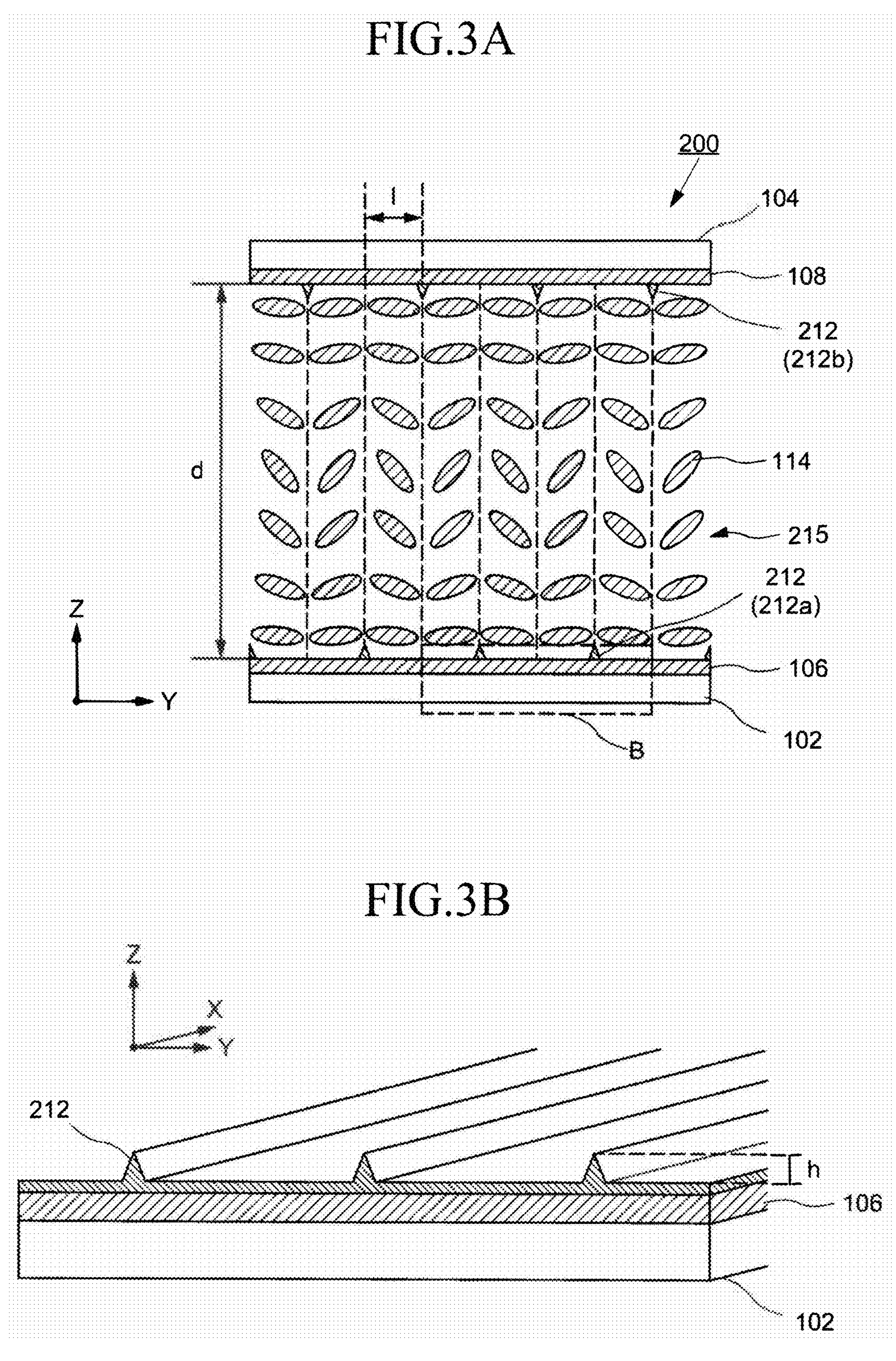
FIG. 3A shows a structure of a phase modulating device according to the present embodiment, and shows a cross-sectional end view corresponding to a line A1-A2 of FIG. 1A.
FIG. 3B shows an enlarged view of a part surrounded by a broken line part B of FIG. 3A.

FIG. 3A is a cross-sectional end view of a first plane of a phase modulating device 200 in which a convex structure 212, which is a modification of the convex structure 112, is arranged. FIG. 3B is an enlarged view showing the convex structure 212 surrounded by a broken line part B shown FIG. 3A. The convex structure 212 shown in FIG. 3B is applied to a first convex structure 212*a* and a second convex structure 212*b*. The convex structure 212 has a triangular cross-section in a cross-sectional view at the first plane, but its base is smaller than the convex structure 112 and the convex structure 212 is a protrusion arranged in the first electrode 106.

The convex structure 212 has the plurality of triangular prism structures extending in the first direction (X-axis direction) parallel to the in-plane direction of the first electrode 106 and arranged in the second direction (Y-axis direction) perpendicular to the first direction. In an embodiment, the triangular cross-section may have the height h of 1/20 to 1/10 with respect to the height d of a liquid crystal layer 215 (h=d/20 to d/10), and the length and the inclined angle of the base are not particularly limited.

In addition, as shown in FIG. 3A, the first convex structure 212*a* and the second convex structure 212*b* are arranged to face each other. However, a corner (first corner) of the first convex structure 212*a* projecting to the second electrode 108 is arranged apart from a corner (second corner) of the second convex structure 212*b* projecting to the first electrode 106 by the predetermined distance I with respect to the second direction (Y-axis direction). In other words, a perpendicular line from the first corner toward the second electrode 108 is parallel to a perpendicular line from the second corner toward the first electrode 106 and does not coincide with the perpendicular line from the second corner toward the first electrode 106. Due to the arrangement of the first convex structure 212*a* and the second convex structure 212*b*, a partition where the plurality of liquid crystal molecules 114 from the first electrode 106 toward the second electrode 108 is arranged is defined by the width I. In the present embodiment, the width I of the partition is smaller than the height d of the liquid crystal layer 215 (I<d).

Since this type of convex structure 212 can be made of a material and a manufacturing method similar to those of the convex structure 112, detailed descriptions will be omitted.

Figures 4A, 4B:
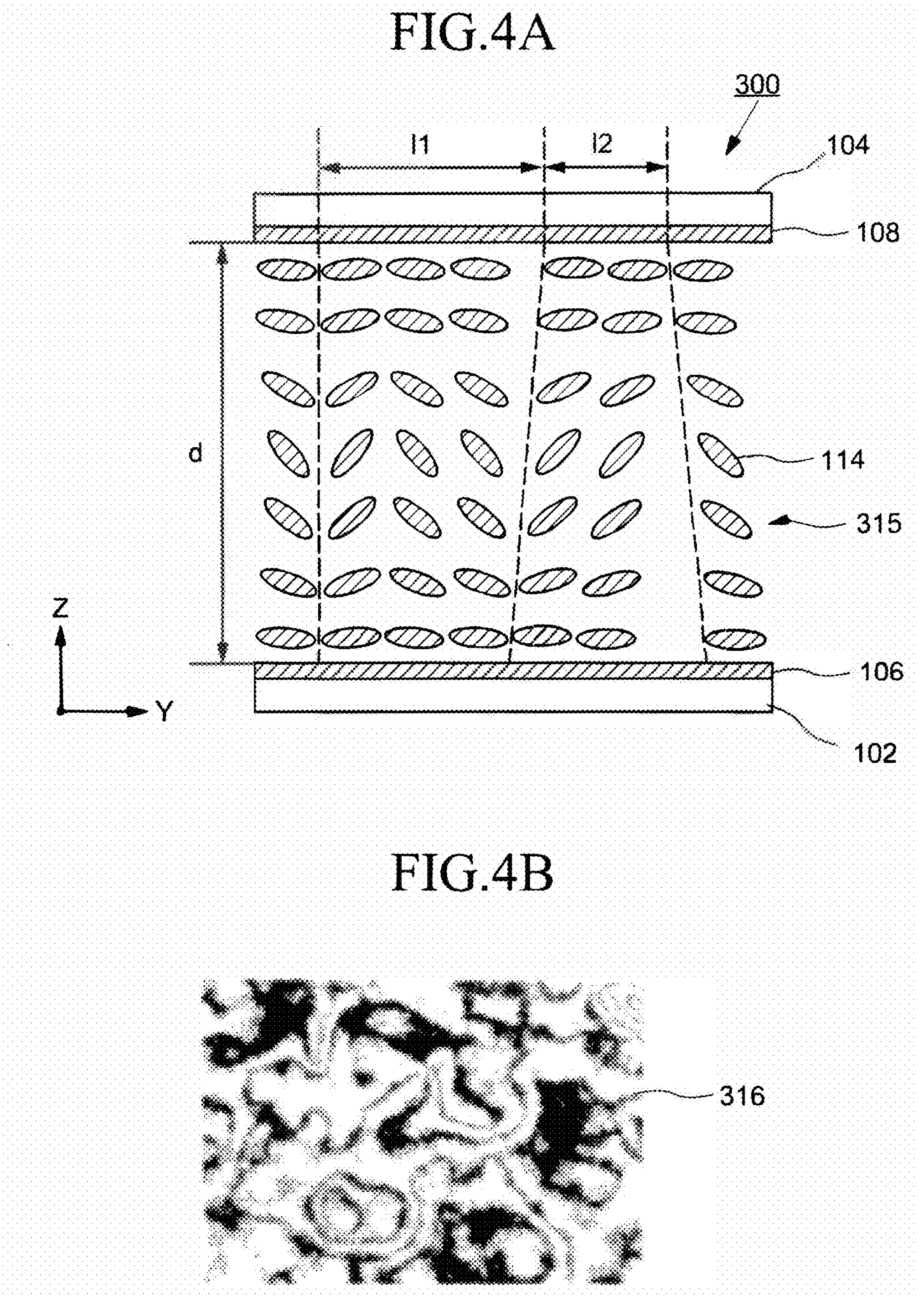
FIG. 4A shows a structure of a phase modulating device according to the present embodiment, and shows a cross-sectional end view corresponding to a line A1-A2 of FIG. 1A.
FIG. 4B shows a figure (cited from Y. limura, S. Kobayashi, T. Sugiyama, Y. Toko, T. Hashimoto, K. Kato," EO Characteristics of Amorphous and Super-Multidomain TN-LCDs Prepared by a Non-Rubbing Method" The institute of Image Information and Television Engineers Technical Report, Volume 18 (Issue 43), pp. 31-36, 1994) in which an amorphized liquid crystal layer was observed from a first electrode.

Orientation control of the liquid crystal molecules 114 described above can also be realized by amorphizing the liquid crystal layer in an embodiment. FIG. 4A shows a cross-sectional end view of on a first plane of a phase modulating device 300 in which a liquid crystal layer 315 is amorphized. FIG. 4B shows the amorphized liquid crystal layer 315 observed from the first electrode 106 (cited from Y. limura, S. Kobayashi, T. Sugiyama, Y. Toko, T. Hashimoto, K. Kato," EO Characteristics of Amorphous and Super-Multidomain TN-LCDs Prepared by a Non-Rubbing Method" The institute of Image Information and Television Engineers Technical Report, Volume 18 (Issue 43), pp. 31-36, 1994). Interference fringes observed in FIG. 4B show borders, that is, partitions, where the liquid crystal molecules 114 having different orientations are adjacent to each other. The liquid crystal layer 315 has a structure in which the liquid crystal molecules 114 are randomly oriented. In addition, it is also characteristic of the liquid crystal layer 315 that a width 11 of the partition is different from a width 12 of an adjacent partition, and the liquid crystal layer 315 as a whole does not exhibit regularity. Further, the height d of the liquid crystal layer 315 is 30 μm to 50 μm, and in the present embodiment, the width I1 and the width 12 of the partitions are smaller than the height d of the liquid crystal layer 315 (I<d).

In the present specification, the term "randomly oriented structure" means that the orientations of the liquid crystal molecules 114 included in the liquid crystal layer 315 do not exhibit regularity as a whole, and does not exclude the fact that the liquid crystal molecules having the same orientation are arranged adjacently in microscopic observation.

This type of liquid crystal layer 315 can be realized by applying the alignment film so as to cover either one or both of the first electrode 106 and the second electrode 108, and then not performing an orientation treatment such as rubbing, encapsulating the liquid crystal molecules 114 in a space between the first electrode 106 and the second electrode 108, heating up to an isotropic phase, and then rapidly cooling it to form a chiral nematic layer. In addition, the alignment film is arranged on at least the first electrode 106.

In the present embodiment, the high-speed orientation control of the liquid crystal molecule 114 can be realized by amorphizing the liquid crystal layer 315 to make the width I of the partition smaller than the height d of the liquid crystal layer 315.

Figures 5A, 5B, 5C:
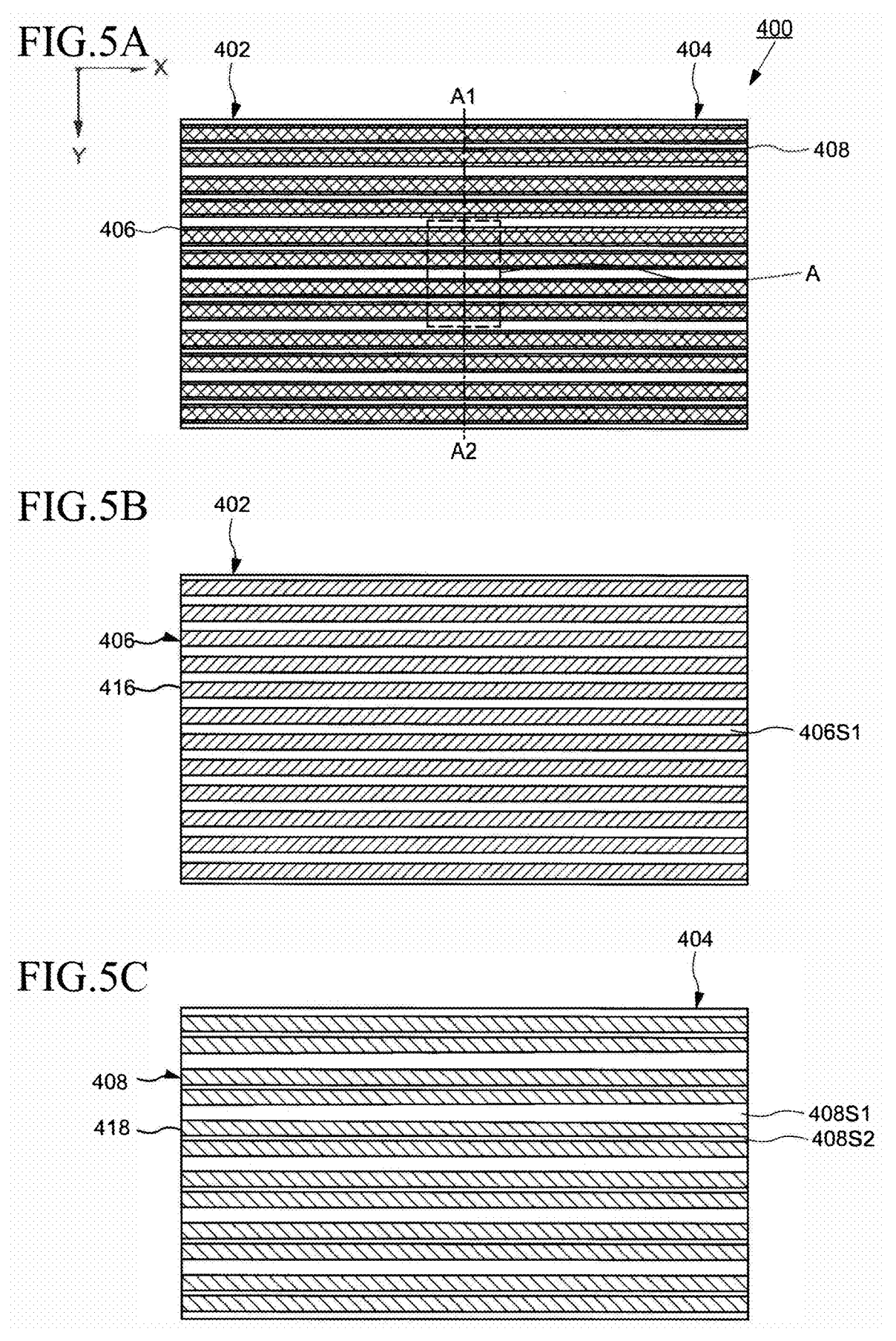

An embodiment in which an arrangement of a first electrode 406 and a second electrode 408 is used as a method for forming the partitions in the liquid crystal layer will be described. FIG. 5A shows a planar view of a phase modulating device 400 according to an embodiment of the present invention. In the present embodiment, the first electrode 406 and the second electrode 408 have a strip-like structure. In addition, in a planar view from the first electrode 406 toward the second electrode 408, the orientation of the liquid crystal molecules 114 is controlled by causing an electric field to be generated obliquely with respect to the first electrode 406 by shifting the arrangement of the first electrode 406 and the second electrode 408.

A detailed explanation will be given with reference to FIG. 5B and FIG. 5C. FIG. 5B shows a planar view of a first substrate 402. A configuration of the first substrate 402 may be the same as the configuration of the first substrate 102, and a detailed explanation thereof will be omitted. The first electrode 406 includes a plurality of striated portions (first striated portions) 416 extending in a first direction (X-axis direction) parallel to the in-plane direction of the first electrode 406 and arranged in the second direction (Y-axis direction) perpendicular to the first direction. In addition, the first electrode 406 includes a slit portion (first slit portion) 406S1 arranged between the plurality of first striated portions 416, respectively. Although the shape of the first electrode 406 is different from that of the first electrode 106 described above, the material and the manufacturing method thereof may have the same configuration as that of the first electrode 106, and detailed descriptions will be omitted.

FIG. 5C shows a planar view of a second substrate 404. A configuration of the second substrate 404 may be the same as the configuration of the second substrate 104, and a detailed explanation thereof will be omitted. The second electrode 408 includes a plurality of second striated portions 418 extending in the first direction (X-axis direction) and arranged in the second direction (Y-axis direction). In addition, the second electrode 408 includes second slit portions 408S1 and third slit portions 408S2 respectively arranged between the plurality of second striated portions 418. Although the shape of the second electrode 408 is different from that of the second electrode 108 described above, the material and the manufacturing method thereof may have the same configuration as that of the second electrode 108, and detailed descriptions will be omitted.

Figure 6:
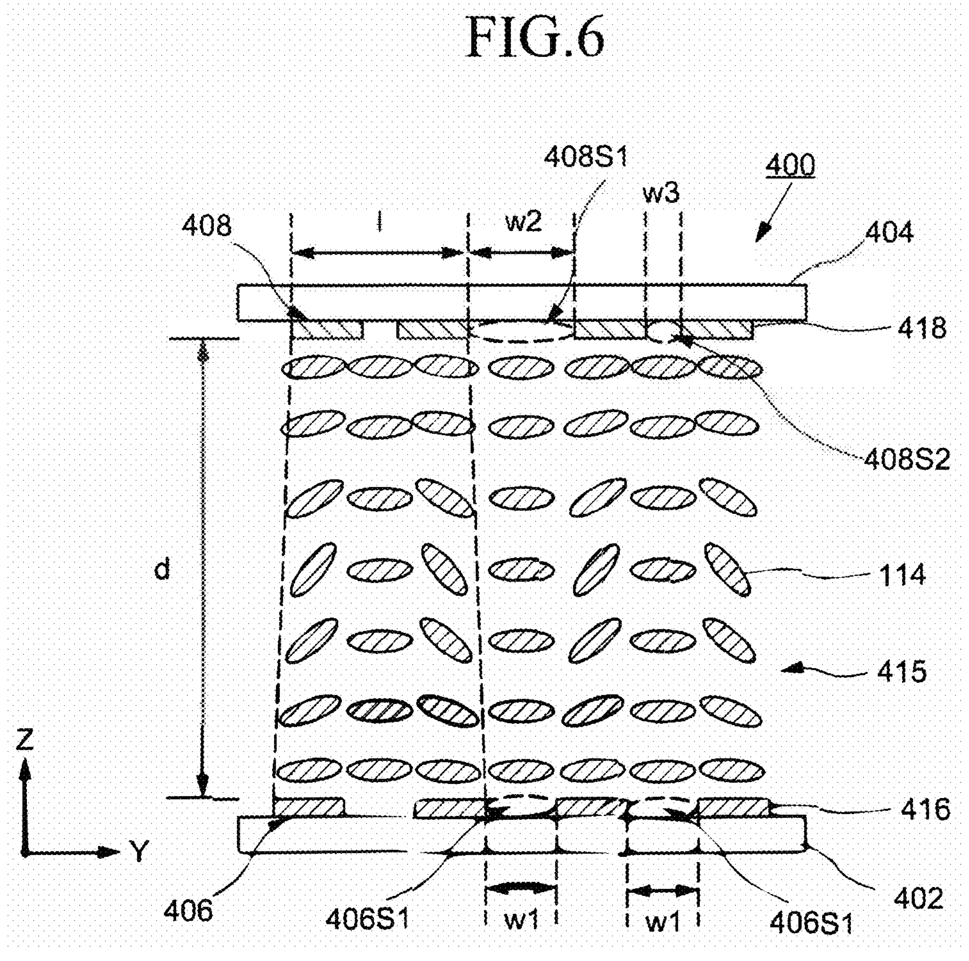
FIG. 6 shows a cross-sectional end view corresponding to a line A1-A2 of FIG. 5A of a phase modulating device according to an embodiment of the present invention.

See FIG. 6. FIG. 6 shows a cross-sectional structure of a part A surrounded by a broken line for a cross-sectional structure along a line A1-A2 shown in FIG. 5A. A liquid crystal layer 415 is arranged between the first electrode 406 and the second electrode 408. The liquid crystal layer 415 is filled with liquid crystal, in other words, the liquid crystal layer 415 includes the plurality of liquid crystal molecules 114. The height d of the liquid crystal layer 415 in the Z-axis direction from the first electrode 406 toward the second electrode 408 is 30 μm or more and 50 μm or less.

In the phase modulating device 400, a width of the first striated portion 416 in the second direction (Y-axis direction) and a width of the second striated portion 418 in the second direction are the same. In the first electrode 406, widths W1 of the first slit portion 406S1 arranged between the first striated portions 416 in the second direction are the same. Therefore, the first striated portions 416 are arranged at equal intervals in the second direction, so that the first electrode 406 is formed. On the other hand, in the second electrode 408, a width W2 of the second slit portion 408S1 arranged between the second striated portions 418 in the second direction is different from a width W3 of the third slit portion 408S2 in the second direction. In the second electrode 408, there is a relationship of w2>w3. In addition, the second slit portion 408S1 and the third slit portion 408S2 are alternately arranged in the second direction.

Furthermore, in the phase modulating device 400, there is a relationship of w2>w1>w3. Therefore, as shown in FIG. 5A, in the phase modulating device 400, in a planar view in the direction from the first electrode 406 toward the second electrode 408, the plurality of first striated portions 416 is arranged so as to overlap only a part of the plurality of second striated portions 418 in the second direction (Y-axis direction). In addition, the configuration of the first electrode 406 and the configuration of the second electrode 408 may be reversed.

In the phase modulating device 400, a partition where the plurality of liquid crystal molecules 114 is arranged from the first electrode 406 toward the second electrode 408 is defined by the width I by the arrangement of the first electrode 406 and the second electrode 408. In the present embodiment, the width I of the partition is smaller than the height d of the liquid crystal layer 415 (I<d). In addition, in a planar view in the direction from the first electrode toward the second electrode, since the phase change of the liquid crystal molecules 114 does not occur at the position where the first slit portion 406S1 and the second slit portion 408S1 overlap and the position where the first slit portion 406S1 and the third slit portion 408S2 overlap, it is preferable to reduce w1, w2, and w3 as long as the partition in the liquid crystal layer 415 can be formed.

The arrangement of the first electrode 406 and the second electrode 408 described in the phase modulating device 400 is an arrangement that is not selected in the liquid crystal display device requiring visibility, and is a structure specific to the phase modulating device 400 designed to have a height in the liquid crystal layer 415 of 30 μm to 50 μm. In the phase modulating device 400, since the liquid crystal molecules 114 are orientation controlled by such a small partition, it is possible to realize a high-speed phase modulation control which is not conventional.

In the phase modulating device 400, the method for controlling the orientation of the liquid crystal molecules 114 by adjusting the widths of the second slit portion 408S1 and the third slit portion 408S2 in the case where the width of the first slit portion 406S1 is constant has been explained. In a phase modulating device 500, a method for controlling the orientation of the liquid crystal molecules 114 by adjusting a position where the first electrode 506 and the second electrode 508 overlap in a planar view in the case where a first slit portion 506S1 and a second slit portion 508S1 have the same width will be explained.

Figures 7A, 7B, 7C:
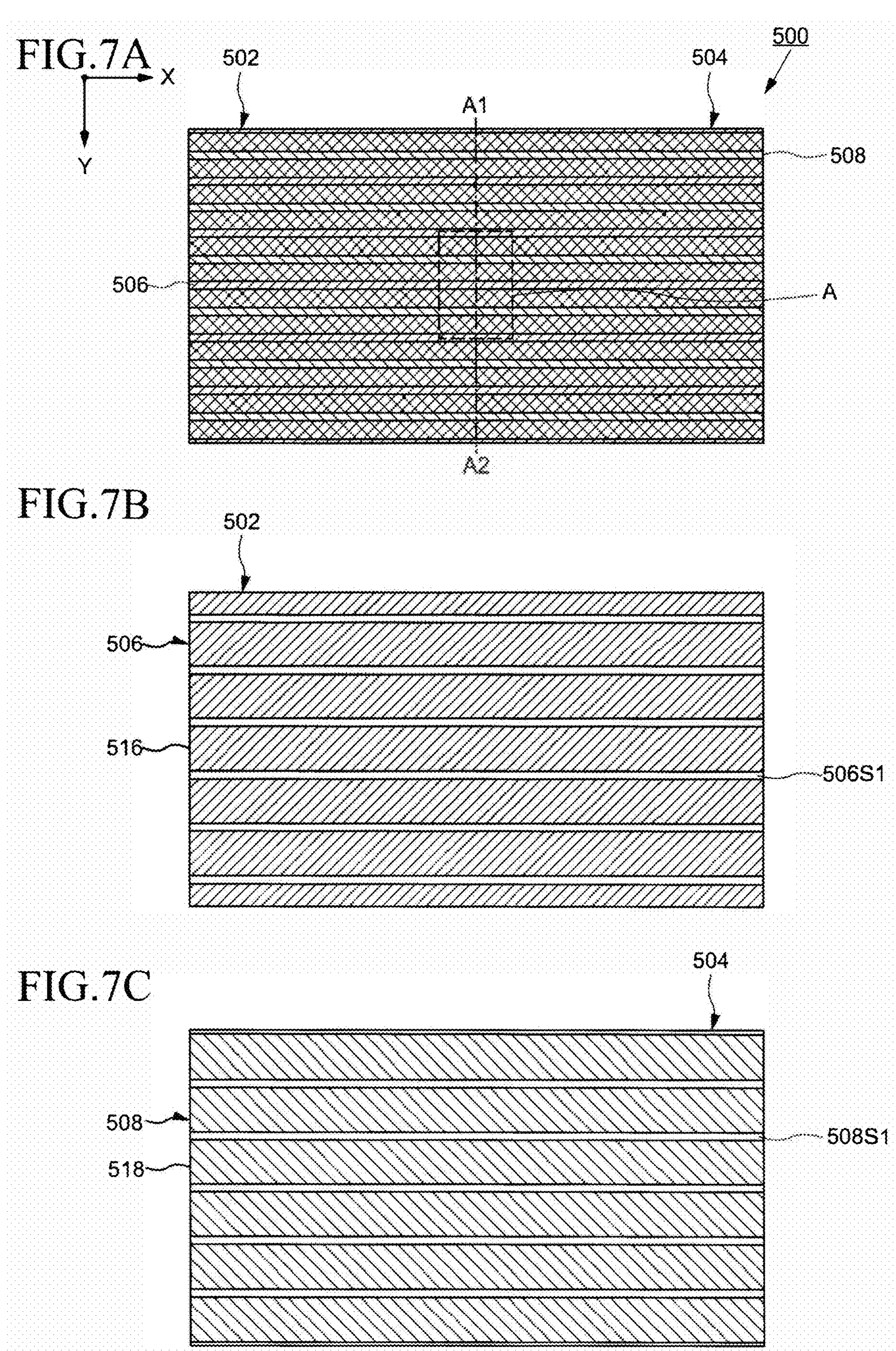
FIG. 7A shows a configuration of a phase modulating device according to an embodiment of the present invention, and shows a planar view in a state where a first substrate and a second substrate overlap each other.
FIG. 7B shows a planar view of a first substrate of a phase modulating device according to an embodiment of the present invention.
FIG. 7C shows a planar view of a second substrate of a phase modulating device according to an embodiment of the present invention.

FIG. 7A shows a planar view of the phase modulating device 500 according to an embodiment of the present invention. In the present embodiment, the first electrode 506 and the second electrode 508 have a strip-like structure. In addition, in a planar view from the first electrode 506 toward the second electrode 508, the orientation of the liquid crystal molecules 114 is controlled by causing an electric field to be generated obliquely with respect to the first electrode 506 to shift the arrangement of the first electrode 506 and the second electrode 508.

A detailed explanation will be given with reference to FIG. 7B and FIG. 7C. FIG. 7B shows a planar view of a first substrate 502. A configuration of the first substrate 502 may be the same as the configuration of the first substrate 102, and a detailed explanation thereof will be omitted. The first electrode 506 includes a plurality of striated portions (first striated portions 516) extending in the first direction (X-axis direction) parallel to the in-plane direction of the first electrode 506 and arranged in the second direction (Y-axis direction) perpendicular to the first direction. In addition, the first electrode 506 includes the slit portion (first slit portion) 506S1 arranged between the plurality of first striated portions 516, respectively. Although the shape of the first electrode 506 is different from that of the first electrode 106 described above, the material and the manufacturing method thereof may have the same configuration as that of the first electrode 106, and detailed descriptions will be omitted.

FIG. 7C shows a planar view of a second substrate 504. A configuration of the second substrate 504 may be the same as the configuration of the second substrate 104, and a detailed explanation thereof will be omitted. The second electrode 508 includes a plurality of second striated portions 518 extending in the first direction (X-axis direction) and arranged in the second direction (Y-axis direction). In addition, the second electrode 508 includes the second slit portion 508S1 arranged between the plurality of second striated portions 518. Although the shape of the second electrode 508 is different from that of the second electrode 108 described above, the material and the manufacturing method thereof may have the same configuration as that of the second electrode 108, and detailed descriptions will be omitted.

Figure 8:
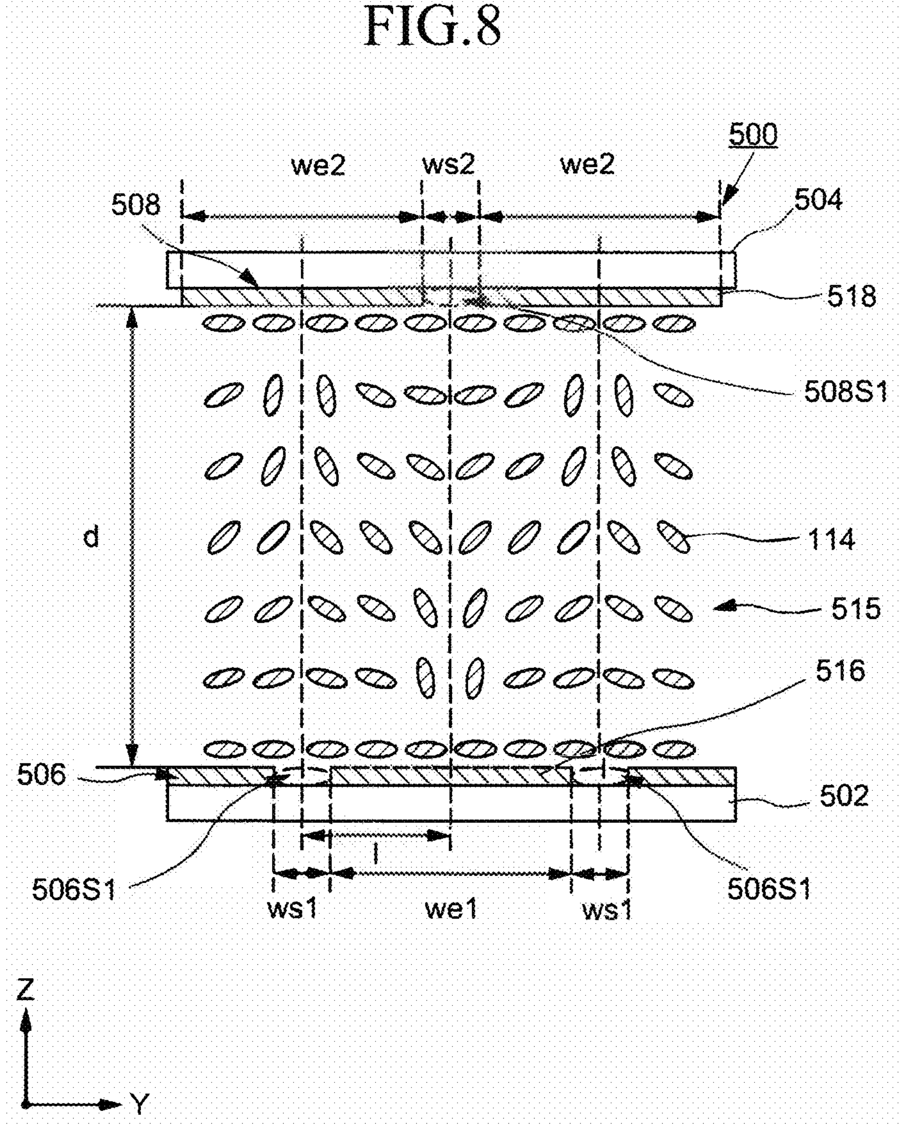
FIG. 8 shows a cross-sectional end view corresponding to a line A1-A2 of FIG. 7A of a phase modulating device according to an embodiment of the present invention.

See FIG. 8. FIG. 8 shows a cross-sectional structure of a part A surrounded by a broken line for a cross-sectional structure along a line A1-A2 shown in FIG. 7A. A liquid crystal layer 515 is arranged between the first electrode 506 and the second electrode 508. The liquid crystal layer 515 is filled with liquid crystal, in other words, the liquid crystal layer 515 includes the plurality of liquid crystal molecules 114. The height d of the liquid crystal layer 515 in the Z-axis direction from the first electrode 506 toward the second electrode 508 is 30 μm or more and 50 μm or less.

In the first electrode 506, widths ws1 of the first slit portion 506S1 arranged between the first striated portions 516 in the second direction are the same. In addition, in the second electrode 508, widths ws2 of the second slit portion 508S1 arranged between the second striated portions 518 in the second direction are also the same. Further, there is a relationship of ws1=ws2. On the other hand, in the phase modulating device 500, widths we1 of the first striated portion 516 constituting the first electrode 506 in the second direction (Y-axis direction) and widths we2 of the second striated portion 518 constituting the second electrode 508 in the second direction (Y-direction) are also the same and have a relationship of we1=we2.

As also shown in FIG. 7A, in the phase modulating device 500, in a planar view from the first electrode 506 toward the second electrode 508, the first striated portion 516 partially overlaps the two second striated portions 518. Furthermore, the second striated portion 518 is arranged so that a portion thereof overlaps the two first striated portions 516. In addition, the configuration of the first electrode 506 and the configuration of the second electrode 508 may be reversed. Further, in order to equalize in-plane response speeds, it is preferable to arrange such that the respective overlapping widths are constant.

In the phase modulating device 500, a partition where the plurality of liquid crystal molecules 114 is arranged from the first electrode 506 toward the second electrode 508 is defined by the width I by the arrangement of the first electrode 506 and the second electrode 508. In the present embodiment, the width I of the partition is smaller than the height d of the liquid crystal layer 515 (I<d). In addition, in a planar view in the direction from the first electrode 506 toward the second electrode 508, since the phase change of the liquid crystal molecules 114 does not occur at the position where the first slit portion 506S1 and the second striated portion 518 overlap and the position where the second slit portion 508S1 and the first striated portion 516 overlap, it is preferable to reduce ws1 and ws2 as long as the partition in the liquid crystal layer 515 can be formed.

The arrangement of the first electrode 506 and the second electrode 508 described in the phase modulating device 500 is an arrangement that is not selected in the liquid crystal display device requiring visibility, and is a structure specific to the phase modulating device 500 designed to have a height in the liquid crystal layer 515 of 30 μm to 50 μm. In the phase modulating device 500, since the liquid crystal molecules 114 are orientation controlled by such a small partition, it is possible to realize a high-speed phase modulation control which is not conventional.

[Phased Array Antenna Device]

Figure 9:
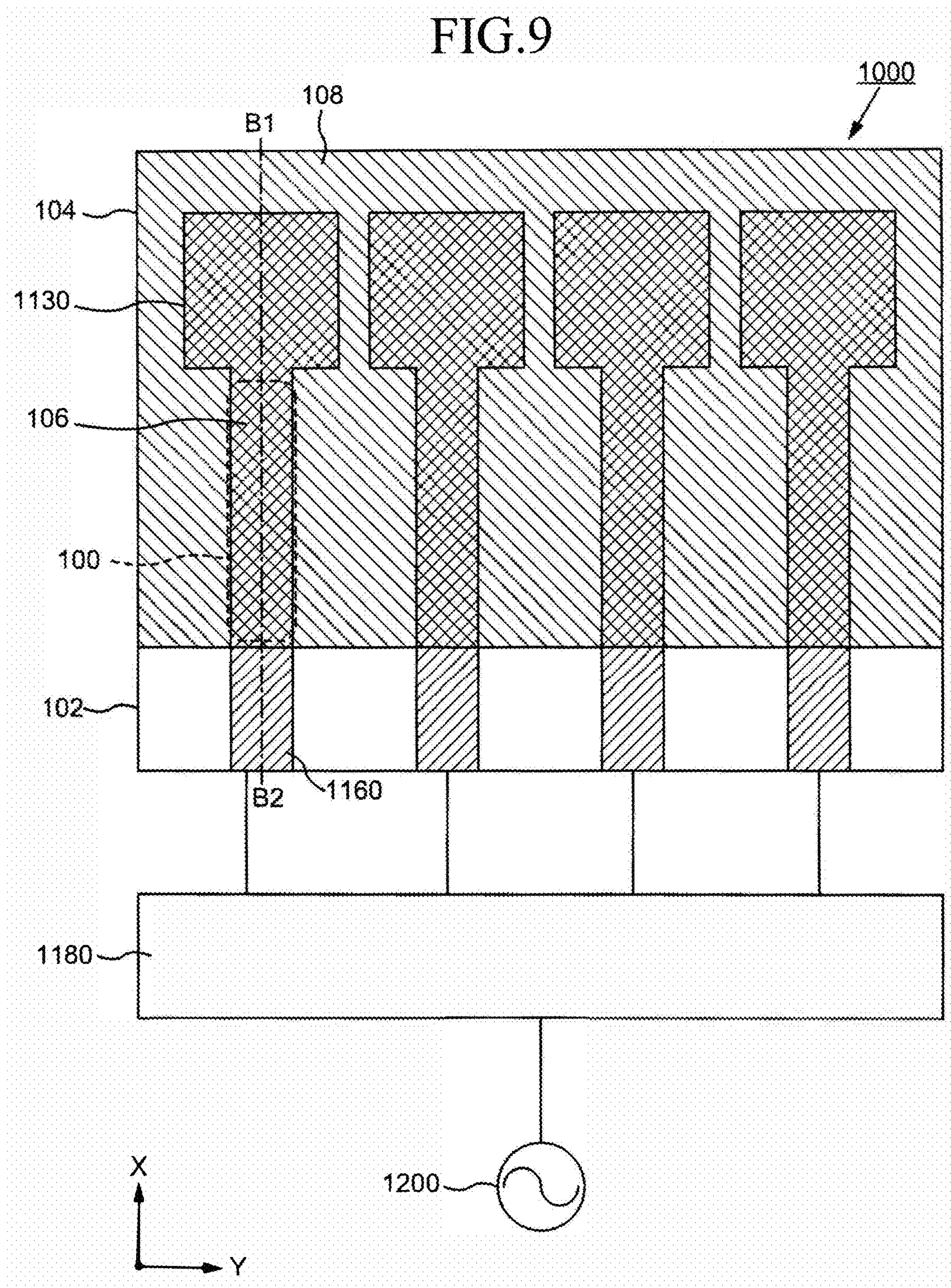
FIG. 9 shows a configuration example of a phased array antenna device 1000 according to an embodiment of the present invention.
Figure 10:
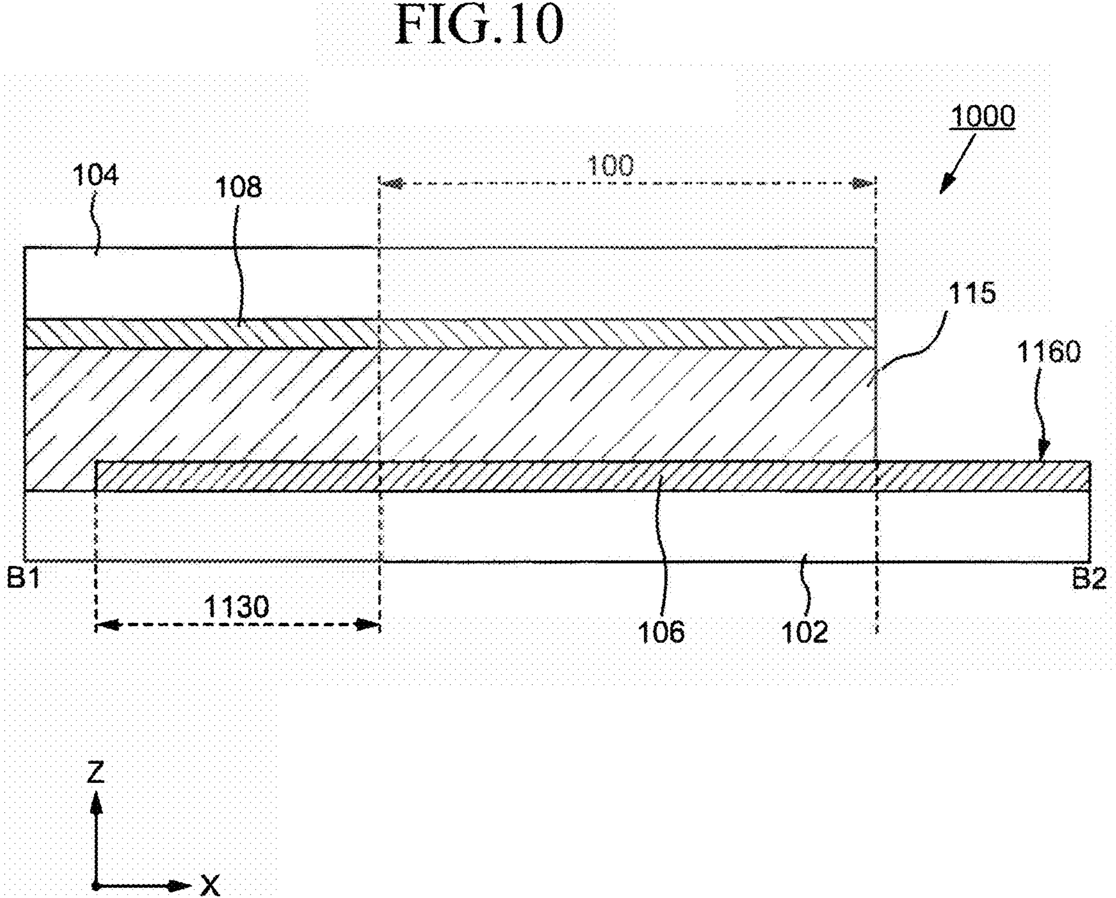
FIG. 10 shows a cross-sectional structure corresponding to a line B1-B2 in FIG. 9.

The phase modulating device described in each of the above embodiments can be used as a phase shifter. A phased array antenna device with a high response speed can be configured by using the phase modulating device as a phase shifter. FIG. 9 shows a configuration example of a phased array antenna device 1000 in which the phase modulating device 100 is used as a phase shifter. FIG. 9 shows a planar view of the phased array antenna device 1000. In addition, FIG. 10 shows a cross-sectional structure corresponding to a line B1-B2 in FIG. 9. In the following, descriptions will be given with reference to FIG. 9 and FIG. 10.

The phased array antenna device 1000 includes the phase modulating device 100 and an antenna element 1130. A plurality of antenna elements 1130 is arranged in a linear shape, an arc shape, or a planar shape to form an antenna element array. The phase modulating device 100 is arranged corresponding to each of the plurality of antenna elements 1130. In addition, the phased array antenna device 1000 has a phase control circuit (not shown). The phase control circuit has a function of outputting a signal for controlling the phase of the phase modulating device 100.

FIG. 9 and FIG. 10 show the case where the phased array antenna device 1000 is for transmission. The phased array antenna device 1000 includes a terminal portion 1160 connected to each of the first electrodes 106 that are microstrip lines. Each terminal portion 1160 is connected to a distributor 1180. The distributor 1180 is connected to an oscillator 1200. The high-frequency signal output from the oscillator 1200 is distributed by the distributor 1180 to each phase modulating device 100.

Electromagnetic waves radiated from each of the plurality of antenna elements 1130 have coherent properties. Therefore, a wave surface having the same phase is formed by the electromagnetic waves radiated from each of the plurality of antenna elements 1130. The phase of the electromagnetic wave radiated from the antenna element 1130 is adjusted by the phase modulating device 100. In the phase modulating device 100, the phase of the high-frequency signal radiated as the electromagnetic wave is controlled by the phase control circuit (not shown). Although line width is widened in the phase modulating device 100 to reduce the loss in the first electrode 106 which is the microstrip line, the response speed of the liquid crystal is increased by arranging the convex structure 112 between the second electrode 108 which is an earth conductor layer. In addition, a similar effect can be obtained in the case where the phased array antenna device 1000 is used for reception.

In the above-described phased array antenna device, although an example in which the phase modulating device 100 is used has been explained, the phased array antenna device may be configured by using any of the phase modulating devices 200 to 500 described above.

[Intelligent Reflecting Surface]

Figure 11:
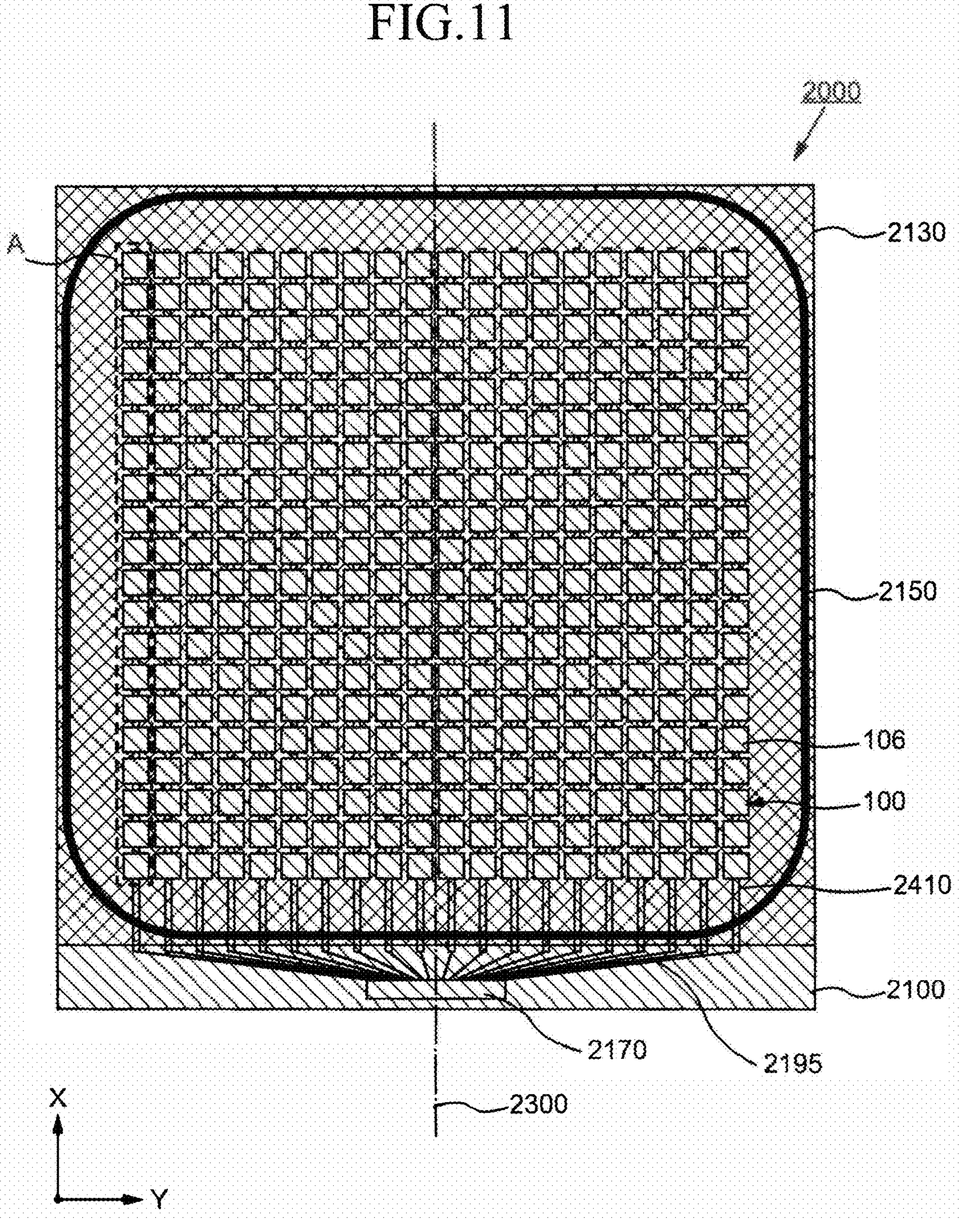
FIG. 11 shows a configuration example of an intelligent reflecting surface using a phase modulating device corresponding to a patch electrode.

A metamaterial reflecting surface that realizes a high response speed can be configured by using the phase modulating device described in each of the above-described embodiments as a patch electrode. FIG. 11 shows a configuration example of an intelligent reflecting surface 2000 using the phase modulating device 100 corresponding to the patch electrodes. FIG. 11 shows a planar view of the uniaxial reflection-controlled intelligent reflecting surface 2000. The intelligent reflecting surface 2000 is arranged such that an array substrate 2100 and a counter substrate 2130 face each other, and the liquid crystal layer 115 is arranged between the array substrate 2100 and the counter substrate 2130. The liquid crystal layer 115 is sealed by a seal 2150. In the array substrate 2100, the plurality of first electrodes 106 is arranged in the first direction (X-axis direction), and the plurality of first electrodes 106 is also arranged in the second direction (Y-axis direction) perpendicular to the first direction. The plurality of first electrodes 106 arranged in the first direction is electrically connected by a thin line pattern 2410. A drive circuit 2170 and the thin line pattern 2410 are electrically connected by a wiring 2195. In addition, the intelligent reflecting surface 2000 has a reflection axis 2300 parallel to the first direction.

The second electrode 108 of the phase modulating device 100 is arranged in the counter substrate 2130. In an embodiment, the second electrode 108 may be arranged over the entire region of the counter substrate 2130 corresponding to the region where the first electrode 106 is arranged.

In the intelligent reflecting surface 2000, in order to input the same signal to a row in the direction (first direction) of the first electrode 106 electrically connected by the thin line pattern 2410, the patch electrodes in the row direction parallel to the reflection axis 2300 surrounded by the broken line in FIG. 11 are all electrically connected to each other.

In the present embodiment, the first electrodes 106 are arranged in an array as a square, a circle, an annular shape, a rectangular frame shape (a hollow rectangle), or a cross-shaped patch electrode symmetrical with respect to the first direction and the second direction, and the first electrodes 106 are electrically connected in a direction parallel to the reflection axis, whereby the behavior for the vertical polarization and the horizontal polarization is adjusted so as to be equal to each other, and it is possible to realize high sensitivity with respect to the target wavelength. In addition, a high response speed can be realized by using the phase modulating device according to the present embodiment as a patch electrode.

Figures 12A, 12B:
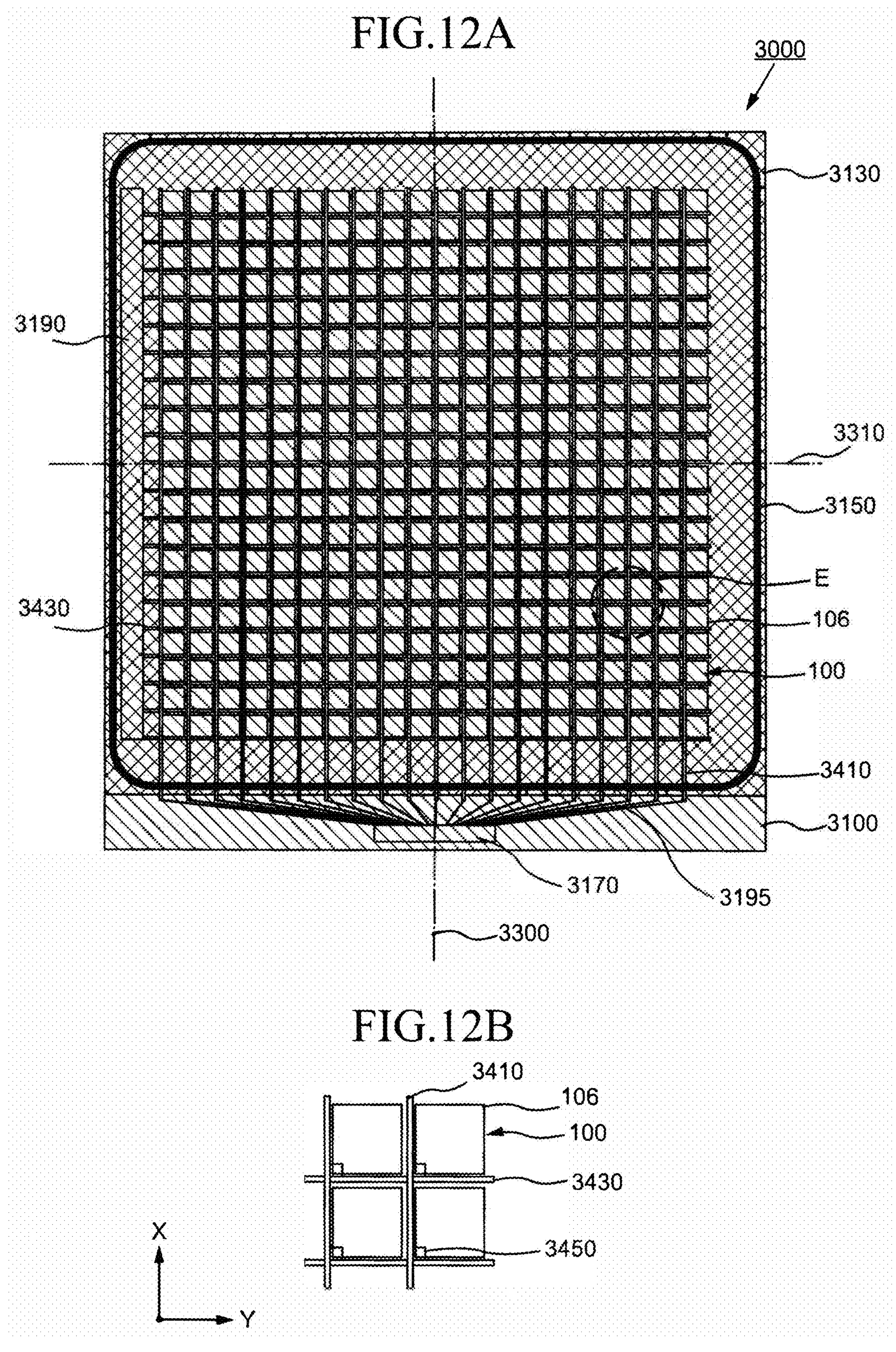
FIG. 12A shows a configuration example of an intelligent reflecting surface using a phase modulating device corresponding to a patch electrode.
FIG. 12B is an enlarged plane of a broken line part E of FIG. 12A.

Since the above-described intelligent reflecting surface 2000 has only one reflection axis 2300, it is possible to control the reflection angle only in a direction in which the reflection axis 2300 is a rotation axis. A biaxial reflection-controlled intelligent reflecting surface 3000 will be described below. FIG. 12A shows a configuration of the intelligent reflecting surface 3000 using the phase modulating device 100 corresponding to the patch electrode. FIG. 12A shows a planar view of the biaxial reflection-controlled intelligent reflecting surface 3000. The intelligent reflecting surface 3000 is arranged such that an array substrate 3100 and a counter substrate 3130 face each other, and the liquid crystal layer 115 is arranged between the array substrate 3100 and the counter substrate 3130. The liquid crystal layer 115 is sealed by a seal 3150. In the array substrate 3100, the plurality of first electrodes 106 is arranged in the first direction (X-axis direction), and the plurality of first electrodes 106 is also arranged in the second direction (Y-axis direction) perpendicular to the first direction. The plurality of first electrodes 106 arranged in the first direction is electrically connected by a thin line pattern 3410. A signal line drive circuit 3170 and the thin line pattern 3410 are electrically connected by a wiring 3195. The intelligent reflecting surface 3000 has a reflection axis 3300 parallel to the first direction.

In addition, the plurality of first electrodes 106 arranged in the second direction is electrically connected by a thin line pattern 3430. The thin line pattern 3430 is electrically connected to a scanning line drive circuit 3190. In addition, the intelligent reflecting surface 3000 has a reflection axis 3310 parallel to the second direction.

FIG. 12B is an enlarged plane of a broken line part E of FIG. 12A. The thin line pattern 3410 and the thin line pattern

Figure 13:
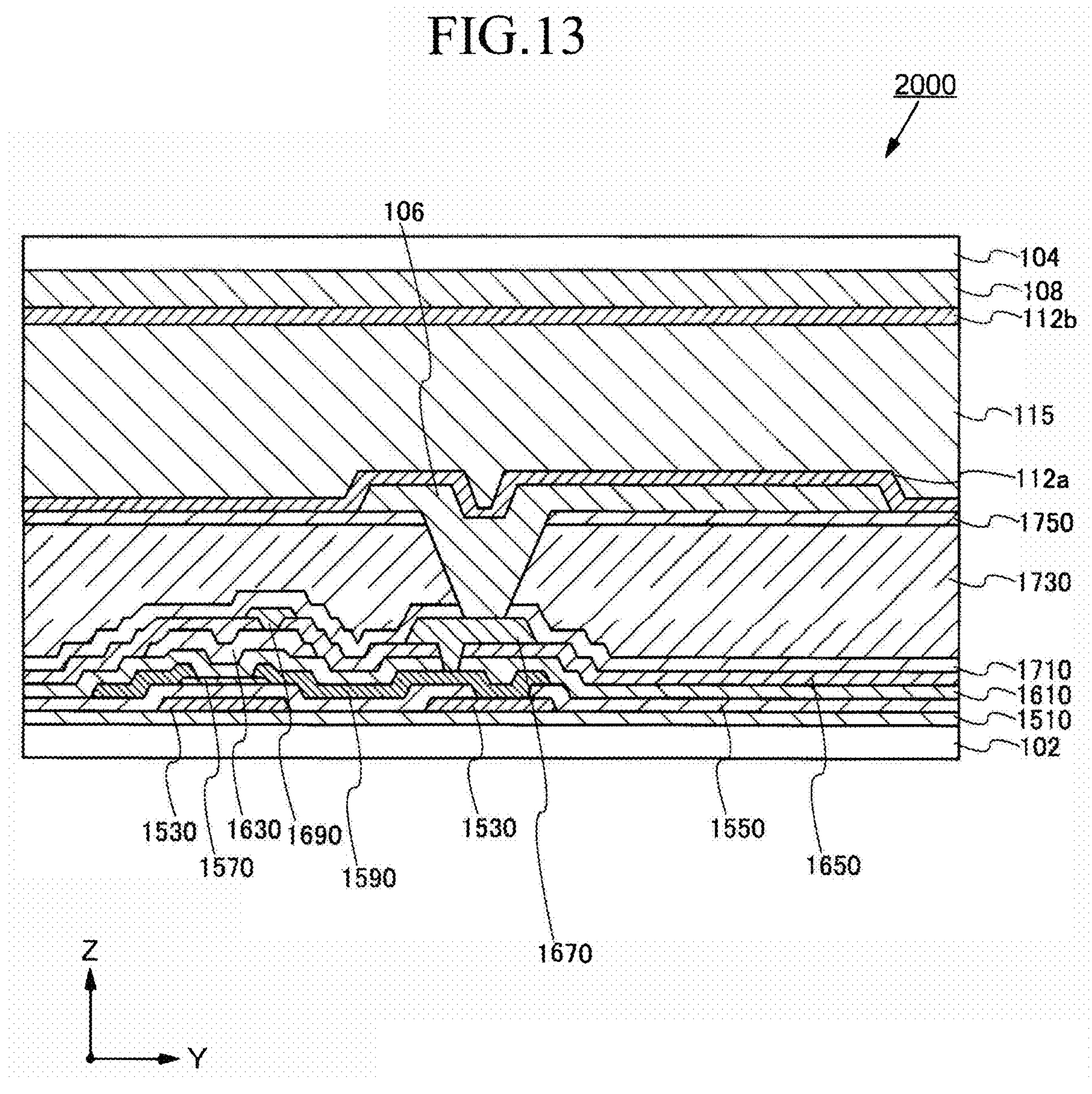
FIG. 13 is a cross-sectional end view showing an example of a TFT arranged on an intelligent reflecting surface.

3430 are connected to a thin film transistor (TFT) 3450. FIG. 13 is a cross-sectional end view showing an example of the TFT 3450. For example, the TFT 3450 has a configuration in which the first substrate 102, an undercoat layer 1510, a gate electrode 1530, a bottom-gate insulating film 1550, an oxide semiconductor layer 1570, a first connecting wiring layer 1590, a top-gate insulating film 1610, a back-gate electrode 1630, a passivation film 1650, a second connecting wiring layer 1670, a signal line 1690, and an insulating film 1710 are sequentially stacked. In the TFT 3450, an overcoat layer 1730, an insulating film 1750, the first electrode 106, the first convex structure 112*a*, the liquid crystal layer 115, the second convex structure 112*b*, the second electrode 108, and the second substrate 104 are sequentially stacked.

For example, the undercoat layer 1510 may be configured with a silicon oxide film. For example, the bottom-gate insulating film 1550 may be configured with a stacked structure of SiN/SiO. For example, the gate electrode 1530 may be configured with molybdenum, tungsten, or an alloy thereof. For example, the top-gate insulating film 1610 may be configured with a silicon oxide film. For example, the first connecting wiring layer 1590 and the second connecting wiring layer 1670 may be configured with a stacked structure of Ti/Al/Ti or a stacked structure of Mo/Al/Mo. For example, the passivation film 1650 may be configured with a silicon nitride film. For example, the insulating film 1710 may be configured with a silicon oxide film or a silicon nitride film. For example, the first electrode 106 may be configured with a stacked structure of Ti/Al/Ti or a stacked structure of Mo/Al/Mo. For example, the second electrode 108 may be configured with molybdenum, tungsten, or an alloy thereof.

In FIG. 13, the TFT 3450 is shown as a dual-gate TFT using an oxide semiconductor, but amorphous silicon may be used or low-temperature polysilicon (LTPS) may be used. Furthermore, in FIG. 13, an example of vertical electric field driving is shown, but horizontal electric field driving may be used.

Since the intelligent reflecting surface 3000 has the reflection axis 3300 parallel to the first direction and the reflection axis 3310 parallel to the second direction, the reflection angle can be controlled in all directions in front of the intelligent reflecting surface depending on the setting of the phase distribution in which the direction with the reflection axis 3300 as the rotation axis and the direction with the reflection axis 3310 as the rotation axis are combined.

The second electrode 108 of the phase modulating device 100 is arranged in the counter substrate 3130. In an embodiment, the second electrode 108 may be arranged over the entire region of the counter substrate 3130 corresponding to the region where the first electrode 106 is arranged.

In the intelligent reflecting surface 3000, the plurality of first electrodes 106 is connected to the plurality of arranged TFTs 3450, respectively. Therefore, the intelligent reflecting surface 3000 is configured so that an independent drive voltage is individually applied to the liquid crystal layer 115 from the corresponding first electrode 106 via each TFT 3450.

In the present embodiment, the first electrodes 106 are arranged in an array as a square, a circle, an annular shape, a rectangular frame shape, or a cross-shaped patch electrode symmetrical with respect to the first direction and the second direction, and the first electrodes 106 are electrically connected in a direction parallel to the reflection axis, whereby the behavior for the vertical polarization and the horizontal polarization is adjusted so as to be equal to each other, and it is possible to realize high sensitivity with respect to the target wavelength. In addition, a high response speed can be realized by using the phase modulating device according to the present embodiment as a patch electrode.

In the above-described intelligent reflecting surface, although an example in which the phase modulating device 100 is used has been described, the intelligent reflecting surface may be configured by using any of the phase modulating devices 200 to 500 described above.

Figures 14A, 14B:
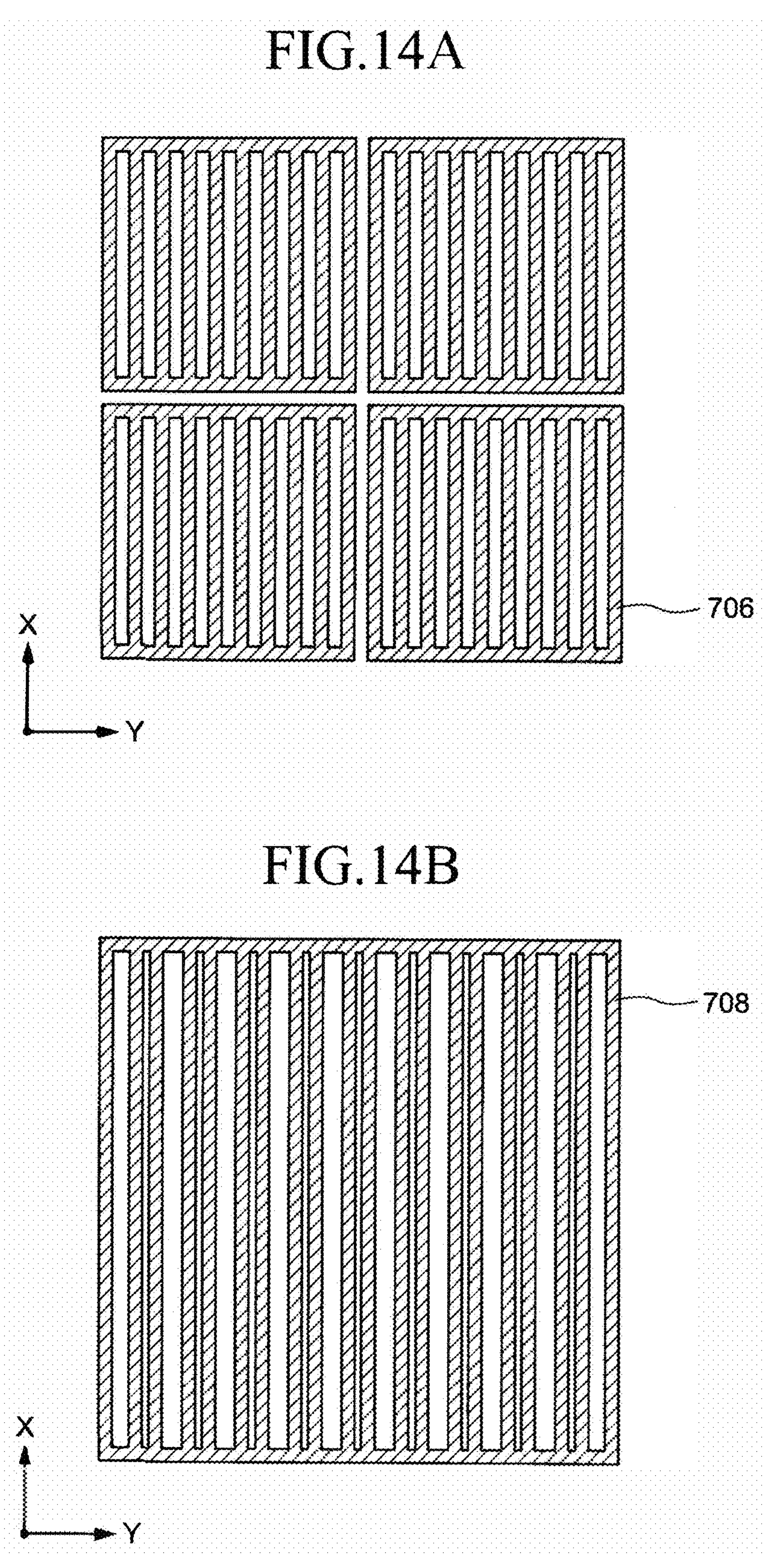
FIG. 14A shows a planar view of a first electrode.
FIG. 14B shows a planar view of a second electrode.

An example in which the above-described phase modulating device 400 is applied to the intelligent reflecting surface 2000 or the intelligent reflecting surface 3000 will be described. FIG. 14A shows a planar view of a first electrode 706. In addition, FIG. 14B shows a planar view of a second electrode 708. Further, in FIG. 14A, four first electrodes 706 may be arranged so that one second electrode 708 is arranged to face these.

Figure 15:
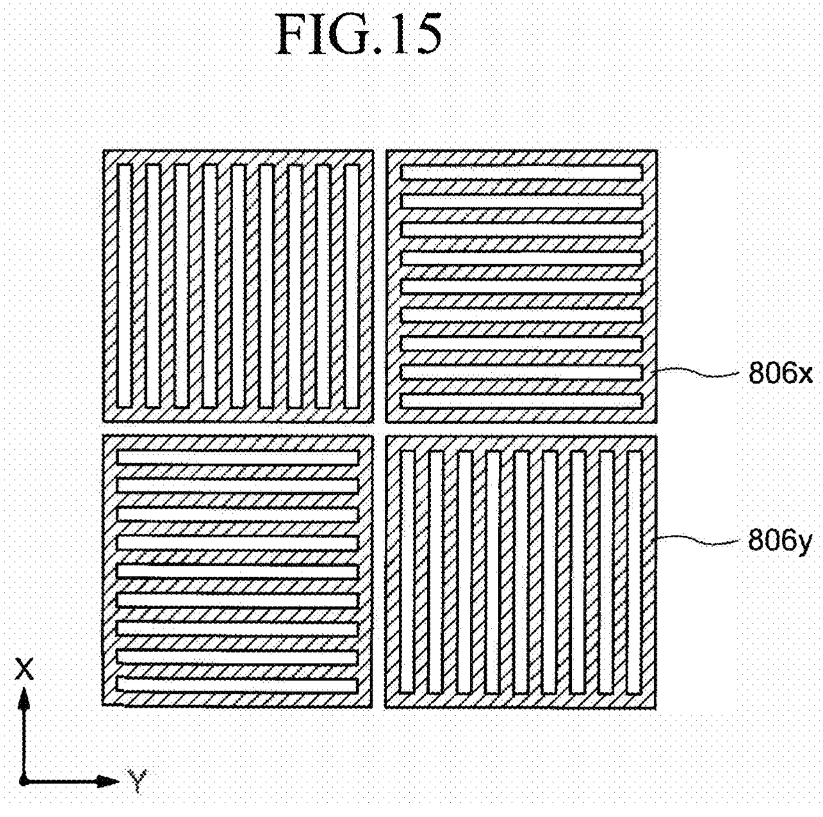
FIG. 15 shows a modification of an arrangement of the first electrode.

FIG. 15 shows a modification of the arrangement of the first electrode. First electrodes 806*x* and first electrodes 806*y* may be alternately arranged in a checkerboard pattern. Although not shown, in this case, the second electrodes are alternately oriented one by one so as to correspond to the first electrode 806*x* and the first electrode 806*y*.

What is claimed is:

1. A phase modulating device comprising:

a first electrode;

a second electrode;

a liquid crystal layer including a plurality of liquid crystal molecules and arranged between the first electrode and the second electrode; and a plurality of first convex structures arranged on the first electrode and projecting to the second electrode, wherein a height of the liquid crystal layer from the first electrode toward the second electrode is 30 μm or more and 50 μm or less, in a planar view of a first plane including the first electrode, the liquid crystal layer and the second electrode, the first plane intersecting with an in-plane direction of the first electrode, and at least two liquid crystal molecules arranged adjacent to each other in a direction parallel to the in-plane direction of the first electrode and oriented differently from each other are included, the plurality of first convex structures has a triangular cross-section in a cross-sectional view at the first plane, and a plurality of triangular prism structures extending in a first direction parallel to the in-plane direction of the first electrode and arranged in a second direction perpendicular to the first direction.

2. The phase modulating device according to claim 1, wherein in the first plane, a liquid crystal molecule having a first inclined angle with respect to the first electrode and a liquid crystal molecule adjacently arranged in a direction parallel to the in-plane direction of the first electrode and having a second inclined angle different from the first inclined angle are contained.

3. The phase modulating device according to claim 1, further comprising:

a plurality of second convex structures arranged on the second electrode and projecting to the first electrode, wherein the plurality of second convex structures has a triangular cross-section in a cross-sectional view at the first plane, and a first corner of the plurality of first convex structures projecting to the second electrode is separated from a second corner of the plurality of second convex structures projecting to the first electrode.

4. The phase modulating device according to claim 1, wherein in the planar view of the first plane, the triangular cross-section has a height of 1/20 to 1/10 of a height of the liquid crystal layer.

5. The phase modulating device according to claim 4, wherein in the planar view of the first plane, the triangular cross-section has an inclined angle of 3° to 5° with respect to a triangular basal plane.

6. The phase modulating device according to claim 1, wherein the first electrode is a microstrip line, and the second electrode is an earth conductor layer.

7. A phased array antenna device comprising:

the phase modulating device according to claim 1.

8. A phase modulating device comprising:

a first electrode;

a second electrode; and a liquid crystal layer including a plurality of liquid crystal molecules and arranged between the first electrode and the second electrode, wherein the first electrode includes a plurality of first striated portions extending in a first direction parallel to the in-plane direction of the first electrode and arranged in a second direction perpendicular to the first direction, and a first slit portion arranged between each of the plurality of first striated portions, wherein a height of the liquid crystal layer from the first electrode toward the second electrode is 30 μm or more and 50 μm or less, in a planar view of a first plane including the first electrode, the liquid crystal layer and the second electrode, the first plane intersecting with an in-plane direction of the first electrode, and at least two liquid crystal molecules arranged adjacent to each other in a direction parallel to the in-plane direction of the first electrode and oriented differently from each other are included, the second electrode includes a plurality of second striated portions extending in the first direction and arranged to the second direction, and a second slit portion arranged between each of the plurality of second striated portions, and in a planar view in a direction from the first electrode to the second electrode, the plurality of first striated portions overlaps only a part of the plurality of second striated portions in the second direction.

9. The phase modulating device according to claim 8, wherein the second electrode includes a third slit portion having a different width from the second slit portion in the second direction, and the second slit portion and the third slit portion are arranged alternately in the second direction in the second electrode.

10. The phase modulating device according to claim 8, wherein in the planar view in a direction from the first electrode to the second electrode, one first striated portion of the plurality of first striated portions partially overlaps two second striated portions of the plurality of second striated portions.

* * * * *